Sept. 19, 1939.     E. C. HORTON     2,173,447
WINDSHIELD CLEANER
Filed April 26, 1935
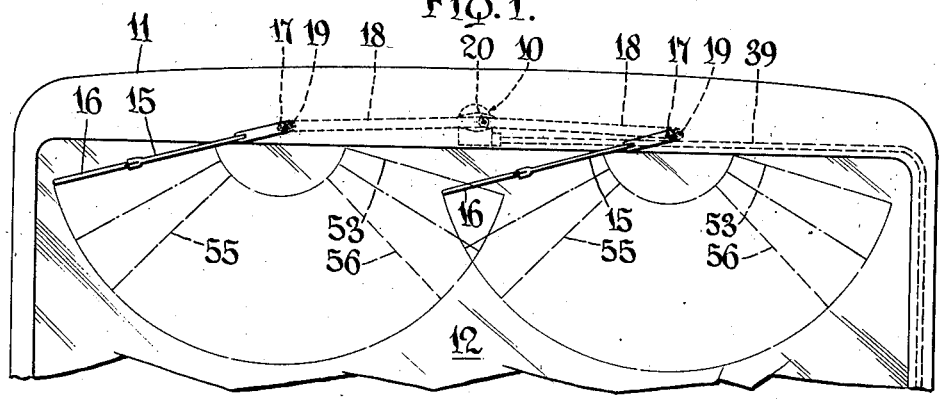
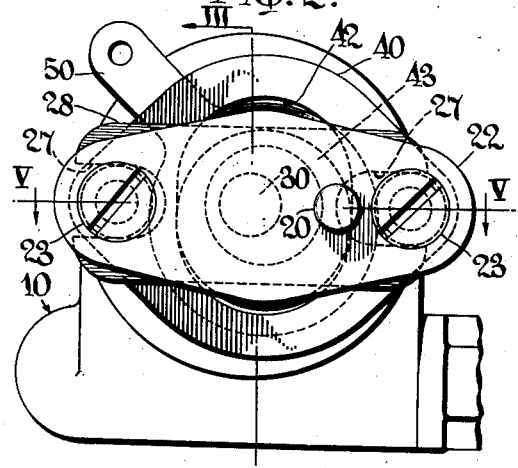
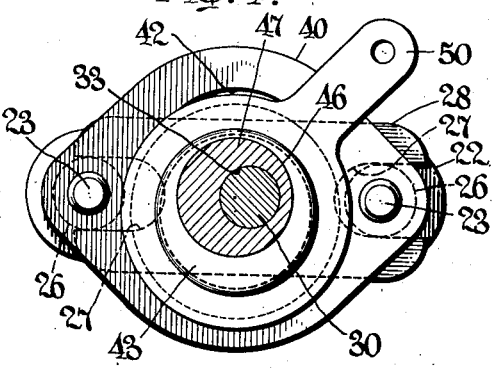
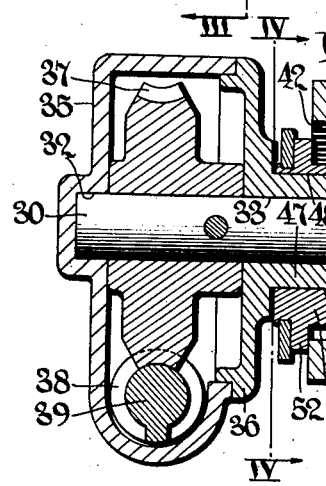
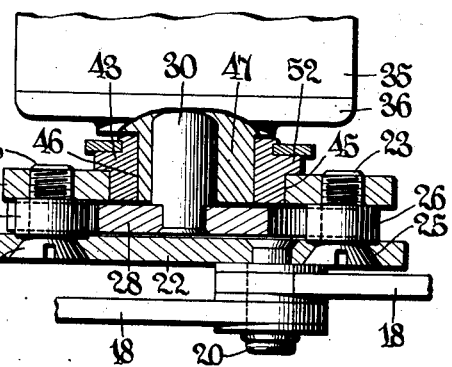
INVENTOR
*Erwin C. Horton*
BY
*Bean, Brooks, Buckley & Bean*
ATTORNEYS Patented Sept. 19, 1939

2,173,447

UNITED STATES PATENT OFFICE 2,173,447

WINDSHIELD CLEANER

Erwin C. Horton, Hamburg, N. Y., assignor to Trico Products Corporation, Buffalo, N. Y.

Application April 26, 1935, Serial No. 18,476

7 Claims. (Cl. 15—255)

This invention relates to windshield cleaners and it has particular relation to a variable wiper stroke construction for use in mechanical windshield wipers.

One object of the invention is to provide a windshield cleaner construction in which the length of the wiping stroke may be varied without altering the rate of operation of the driving mechanism.

Another object of the invention is to provide a crank operated windshield wiping mechanism wherein the effective crank stroke for actuating the wiper arm can be varied to increase or retard the speed of the wiper arm.

Another object of the invention is to provide an improved windshield cleaner operating mechanism for varying the speed and stroke of a wiper arm in a construction in which the wiper driving force is supplied by a rotatable member.

In windshield cleaners of the type which is driven by a variable speed shaft in an internal combustion engine, certain speed compensating devices have been installed to prevent too wide a range of speed that would result from operation of the cleaner at speeds proportional to the highly variable speed of cleaner driving member of the engine. While it is possible, by the use of such devices, to restrict the speed of the cleaner at or below a predetermined maximum value, there is still considerable variation in speed in the operation of most of the known types of so-called mechanical windshield cleaners as distinguished from suction or fluid motor cleaners.

This invention is concerned principally with a construction which can provide for changes of length of wiper arm stroke within material limits, and wherein the change in stroke length can also result in variation in stroke speed while a continuously rotatable member drives the wiper arm. This construction can be employed with or without other speed regulating and compensating devices.

In the drawing:

Fig. 1 is a front elevation of a vehicle body having a windshield cleaner structure embodying the invention incorporated therein;

Fig. 2 is a front elevation, on a larger scale, of a stroke varying mechanism for wiper arm operation;

Fig. 3 is a vertical section taken substantially along the line III—III of Fig. 2;

Fig. 4 is a cross section taken substantially along the line IV—IV of Fig. 3; and Fig. 5 is a cross section taken substantially along the line V—V of Fig. 2, and with portions of the structure shown in plan.

In practicing the invention, a windshield cleaner structure 10 is mounted upon a vehicle body 11 adjacent its windshield 12 and a pair of wiper arms 15 having wiper blades 16 mounted thereon are provided with pivotal connections 17 on the vehicle body. These connections are spaced from the ends of the arms 15 and outer ends of a pair of links 18 are provided with pivotal connections 19 securing them to the outer ends of the arms 15. The inner ends of the links 18 are pivotally connected to a pin 20 that is rigidly mounted upon, and projects at right angles from an oblong plate 22.

It will be observed that the pin 20 is disposed intermediate the ends of the plate 22, but also is spaced from the central portion of this plate. A pair of machine screws 23 having flared heads 25 are disposed through opposite end portions of the plate and the outer surfaces of these screw heads are flush with the outer surface of the plate 22. Rollers 26 are mounted upon the intermediate or shank portions of the screws 23 and are disposed in guide slots or notches 27 formed in opposite ends of a bar 28 that is rigidly secured at its central portion upon a shaft 30.

Suitable bearings 32 and 33 formed in casing sections 35 and 36, respectively, rotatably support the shaft 30 and a worm gear 37 is rigidly mounted upon the shaft inside the casing sections. A worm 38 which is provided rigidly upon a flexible driving shaft 39 rotates the shaft 30 and is rotatably mounted in the casing section 35.

The ends of the screws 23 opposite their heads 25 are threaded through diametrically opposite portions of a cam plate 40 that has a substantially oval or oblong opening 42 in the central portion thereof. As viewed in Fig. 2, the longer axis of the opening is upright. A cam 43 having an outer cylindrical surface 45 is disposed in the opening 42 of the cam plate and the horizontal width of this opening is substantially equal to the diameter of the cylindrical surface 45. Thus the cam fits snugly but movably in the opening 42 of the cam plate.

The cam 43 is mounted eccentrically upon an outer cylindrical surface 46 of a supporting boss 47 which is formed integrally upon the casing section 36 and in which the bearing 33 is formed. An inner central opening 48 is formed in the cam eccentrically of its cylindrical surface 45 and insures proper rotation of the cam upon the cylindrical surface 46 of the boss.

Referring to Fig. 4, it will be observed that the shaft 30 is mounted in the bearing 33 which is formed eccentrically of the cylindrical boss surface 46.

An adjusting lever 50 provided rigidly upon the cam 43 is adapted to be moved from left to right, as viewed in Fig. 2, to rotate the cam about the cylindrical surface 46, and a radial flange 52 formed on the cam 43 serves as a guide against the surface of cam plate 40. Rotation of the cam 43 in a clock-wise direction (Fig. 2) causes the cam surface 45 to impinge upon the left wall surface of the opening 42 and move the plate 40, together with the plate 22, to the left, while the rollers 26 are guided in the slotted guides 27 of the crank bar 28. Thus the axis of the crank pin 20 is moved nearer the axis of the actuating shaft 30.

In operating the structure shown, the shaft 30 is driven by a flexible shaft 39 and the stroke of the wiper arm is determined by the distance between the axis of the shaft 30 and crank pin 20. This distance constitutes the effective crank arm length between the shaft 30 and link 18. As shown in Fig. 5, maximum effective crank arm length is provided for each wiper arm 15 which will be operated between its full line position shown in Fig. 1 and the broken line position indicated at 53. Upon shifting the adjusting lever 50 to the right, as viewed in Fig. 2 to move the axis of the pin 20 nearer the axis of the shaft 30, the stroke of each wiper arm 15 can be regulated between the maximum position indicated and the minimum stroke position indicated by the broken lines 55 and 56.

The length of the stroke can be materially varied, and it is apparent that at a constant speed of the shaft 30, the speed of the wiper arm can be materially varied because the shorter stroke requires the same period of time as the longer stroke. Hence, during the shorter stroke operation of the wiper arm there is less wiping speed across the surface of the windshield. Although the speed of the shaft 30 varies it can of course, and frequently will, rotate at constant speeds for certain periods. Hence, for convenience, comparisons are drawn with reference to constant speed of the shaft.

As an example of the utilization of the adjusting features described, the shorter stroke is more practical for cleaning snow from the windshield, because this substance tends to pack against the vehicle frame at the extremities of the longer stroke area. On the other hand, the snow is more likely to fall or slide downwardly upon the glass when it is brushed or wiped to the position indicated by the broken lines 56. Various other applications of the invention will be apparent in the use of the structure described.

Although only one form of the invention has been shown and described in detail it will be apparent to those skilled in the art that the invention is not so limited, but that various changes may be made therein without departing from the spirit of the invention or from the scope of the invention as defined by the appended claims.

I claim:

1. In a windshield cleaner for a motor vehicle, a rotatable driving member having means for rotatably supporting it in the motor vehicle, an oscillatable wiping member having a pivotal support on the motor vehicle for wiping action across the surface of the vehicle windshield, a rotatable eccentric member, means for supporting the eccentric member for eccentric movement with respect to the axis of the driving member, a shiftable crank pin having driving connection with the driving member and to the oscillatable member, for oscillating the latter, and connections between the crank pin and eccentric member and responsive to movement of the eccentric member for varying the distance from the crank pin to the axis of the driving member whereby the extent of the wiping stroke of the oscillatable wiping member across the surface of the vehicle windshield is variable.

2. In a windshield cleaner for a motor vehicle, a rotatable driving member having means for rotatably supporting it in the motor vehicle, an oscillatable wiping member having a pivotal support on the motor vehicle for wiping action across the surface of the vehicle windshield, a rotatable eccentric member having a bearing surface carried by said means, said bearing surface being eccentric with respect to the axis of said rotatable driving member, and crank mechanism having connection with the oscillatable member and with the eccentric member, said eccentric member normally engaging the crank mechanism and operable to move the latter toward and away from the axis of the driving member whereby the extent of the wiping stroke of the oscillatable wiping member across the surface of the vehicle windshield is variable.

3. In a windshield cleaner for a motor vehicle, a rotatable driving member having means for rotatably supporting it in the motor vehicle, an oscillatable wiping member having a pivotal support on the vehicle for wiping action across the surface of the vehicle windshield, a rotatable eccentric member having a bearing surface carried by said means, said bearing surface being eccentric with respect to the axis of said driving member, a crank member rigidly connected to the driving member, a crank pin, mechanism connected to the crank pin and movable transversely of the axis of the driving member and upon the crank member, and means connected to the eccentric member and to said mechanism and responsive to eccentric rotation of the eccentric member to vary the effective crank length of the cooperating crank member and pin whereby the extent of the wiping stroke of the oscillatable wiping member across the surface of the vehicle windshield is variable.

4. In a windshield cleaner for a motor vehicle, a rotatable driving member having means for rotatably supporting it in the motor vehicle, an oscillatable wiping member having a pivotal support on the motor vehicle for wiping action across the surface of the vehicle windshield, a rotatable eccentric member having a bearing surface carried by said means, said bearing surface being eccentric with respect to the axis of the driving member, a crank member rigidly connected to the driving member and having guides formed thereon, mechanism movable along said guides transversely of the axis of the driving member, a crank pin secured to said mechanism and connected to the oscillatable member for transmitting motion of oscillation thereto, and an eccentric rotatably mounted upon said supporting means and engaging said mechanism to move the latter in the guides whereby effective crank length of the crank member, together with the extent of the wiping stroke of the oscillatable wiping member across the surface of the vehicle windshield, is varied.

5. In a windshield cleaner for a motor vehicle, a rotatable driving member having means for rotatably supporting it in the motor vehicle, an oscillatable wiping member having a pivotal support on the motor vehicle for wiping action across the surface of the vehicle windshield, a crank member rigidly connected to the driving member and having guides formed thereon, a crank pin having guide members movable in said guides and having connection with the oscillatable member, an eccentric rotatably mounted upon said means about an axis offset from the axis of the driving member and having a cylindrical surface, and a member connected to the guide members and having an opening therein for receiving the cylindrical surface of the eccentric in camming relation whereby the rotary movement of the eccentric actuates the guide members to vary the effective crank length of the cooperating crank member and crank pin whereby the extent of the wiping stroke of the oscillatable wiping member across the surface of the vehicle windshield is variable.

6. In a windshield cleaner for a motor vehicle, a rotatable driving member having means for rotatably supporting it in the motor vehicle, an oscillatable wiping member having a pivotal support on the motor vehicle for wiping action across the surface of the vehicle windshield, mechanism connecting the driving member to the oscillatable member and operable to transmit oscillatory motion to the latter member across the surface of the vehicle windshield, and means incorporated in said mechanism and operable during continuous normal operation of the driving and oscillatable members for varying the degree of oscillation of the oscillatable member at constant speed of the driving member.

7. In a windshield cleaner for motor vehicles, a windshield wiping device, means for pivotally supporting the wiping device in the motor vehicle for oscillatory movement over the surface of a windshield, driving means having means for mounting it in the vehicle, mechanism connecting the driving means to the wiping device and adjustable to a plurality of paths of movement relative to said mounting means to transmit different degrees of oscillatory motion to the wiping device, and control means connected to said mechanism and constantly actuatable during operation of the driving means and wiping device to vary the path of movement of said mechanism whereby oscillatory action of the wiping device on the windshield is variable at will.

ERWIN C. HORTON.